(12) United States Patent
Näslund et al.

(10) Patent No.: US 11,243,744 B2
(45) Date of Patent: Feb. 8, 2022

(54) METHOD FOR PERFORMING A TRUSTWORTHINESS TEST ON A RANDOM NUMBER GENERATOR

(71) Applicant: Telefonaktiebolaget LM Ericsson (publ), Stockholm (SE)

(72) Inventors: Mats Näslund, Bromma (SE); Elena Dubrova, Sollentuna (SE); Karl Norrman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 267 days.

(21) Appl. No.: 16/339,914

(22) PCT Filed: Nov. 15, 2016

(86) PCT No.: PCT/EP2016/077704
§ 371 (c)(1),
(2) Date: Apr. 5, 2019

(87) PCT Pub. No.: WO2018/091071
PCT Pub. Date: May 24, 2018

(65) Prior Publication Data
US 2020/0050430 A1  Feb. 13, 2020

(51) Int. Cl.
*G06F 7/58* (2006.01)
*H04L 9/32* (2006.01)

(52) U.S. Cl.
CPC .............. *G06F 7/582* (2013.01); *G06F 7/588* (2013.01); *H04L 9/3278* (2013.01)

(58) Field of Classification Search
CPC .......... G06F 7/582; G06F 7/588; H04L 9/3278
See application file for complete search history.

(56) References Cited

U.S. PATENT DOCUMENTS 9,279,850 B1 * 3/2016 Pedersen ............... H03K 19/003
10,630,492 B2 * 4/2020 Guilley ................. G06F 11/263
(Continued)

OTHER PUBLICATIONS

Hussain, Siam U., et al., "A Built-in-Self-Test Scheme for Online Evaluation of Physical Unclonable Functions and True Random No. Generators", IEEE Transactions on Multi-Scale Computing Systems, vol. 2, No. 1, Jan.-Mar. 2016, pp. 2-16.
(Continued)

*Primary Examiner* — Michael D. Yaary
(74) *Attorney, Agent, or Firm* — Murphy, Bilak & Homiller, PLLC

(57) ABSTRACT

A method (40) is provided for performing a trustworthiness test on a random number generator, RNG, (20) comprising a physical unclonable function, PUF-module (21). The trustworthiness test is implemented as a known answer test, KAT, and the method (40) comprises: receiving (41), in the PUF-module (21), an input based on test data, T, received from a verifier (11) provided with at least one test data-test result pair, (T, R), providing (42) an output from the PUF-module (21), determining (43) a test result, R', based on the output from the PUF-module (21), and providing (44) the test result, R', to the verifier (11). A random number generator (20), computer program and computer program products and a method performed by or in a verifier are also provided.

19 Claims, 5 Drawing Sheets

(56) References Cited

U.S. PATENT DOCUMENTS

2015/0278527 A1* 10/2015 Falk ..................... H04L 9/3278
                                                           726/25
2018/0034793 A1*  2/2018 Kibalo .................. G06F 21/575

OTHER PUBLICATIONS

Maiti, Abhranil, et al., "Physical Unclonable Function and True Random Number Generator: a Compact and Scalable Implementation", VLSI, ACM, New York, NY, May 10, 2009, pp. 425-428.

O'Donnell, Charles W., et al., "PUF-Based Random Number Generation", MIT CSAIL CSG Technical Memo 481, Nov. 1, 2014, pp. 1-4.

Sadr, Ali, et al., "Physical Unclonable Function (PUF) Based Random No. Generator", Advanced Computing: An International Journal (ACU), vol. 3, No. 2, Mar. 2012, pp. 1-7.

Suh, G. Edward, et al., "AEGIS: A single-chip secure processor", Information Security Technical Report (2005) 10; www.sciencedirect.com, 2005, pp. 63-73.

Rukhin, Andrew, et al., "A Statistical Test Suite for Random and Pseudorandom Number Generators for Cryptographic Applications", National Institute of Standards and Technology; Special Publication 800-22; Revision 1a, Apr. 2010, pp. 1-131.

* cited by examiner

METHOD FOR PERFORMING A TRUSTWORTHINESS TEST ON A RANDOM NUMBER GENERATOR

TECHNICAL FIELD

The technology disclosed herein relates generally to the field of network and information security, and in particular to a method for performing a trustworthiness test on a random number generator comprising a physically unclonable function module, the trustworthiness test being implemented as a known answer test, to a random number generator, to computer program and computer program product and to a method in a verifier.

BACKGROUND

There are many products relied on as being secure in the sense of having cryptographic functionality that cannot be tampered with. It should be difficult for a user to change a cryptographic functionality of a product, and a manufacturer of the product should be able to ensure that the cryptographic functionality in the product can be used only as intended, i.e. according to its specification. It is known that random number generators (RNGs) are common targets for attacks on the cryptographic functionality. It is therefore important to make the RNGs secure and also to be able to test them to assure their trustworthiness. Sometimes it is a RNG which is broken, not the cryptographic algorithms themselves.

There are two different types of random numbers generators which are used in cryptographic systems: a true random number generator (TRNG) and a pseudorandom number generator (PRNG). The true random number generator (also denoted entropy generator) collects entropy from the physical world. For instance, entropy data may be collected from low-level physical effects such as thermal noise and noise captured from a computer's microphone, or effects like mouse movements and hard disk seek times. The pseudorandom number generator typically processes the output of the TRNG to expand it in order to provide more bits and also, in some cases, provide additional post-processing in case the output of the TRNG is biased, or more generally, when the output statistical distribution is not the desired one.

The pseudorandom number generators are deterministic, i.e. a given seed will always get expanded into the same pseudo-random sequence. PRNGs can be used on cryptographic algorithms (e.g., block ciphers or hash functions) to process a seed from a TRNG into a longer sequence of apparently randomly looking bits.

In most cases, it's rare for an application to use the raw output of the TRNG directly. For example, a low-level entropy collector may use cryptographic constructions such as hash functions in order to mix the outputs of various entropy sources. The produced bits may then be used as seeds to the PRNGs. As another example, in a secure random number generator, a hardware circuit may collect high-entropy electronic noise, which is then processed to produce the output. This 'raw randomness' may then be used as seed to the PRNG.

The post-processing by a PRNG of a seed value from a TRNG has some implications. The presence of a PRNG implies that the underlying TRNG can occasionally produce a biased output (with either 1s or 0s predominating) without this being detectable by an application. However, the underlying TRNG circuit could get faulty, e.g. due to a random error or due to a maliciously inserted intentional backdoor, and continuously produce low-entropy seeds, again without this being detectable by an application.

To assure that a RNG works as expected, tree types of tests are applied: statistical tests, known answer tests and runtime health checks.

In statistical tests the main idea is to subject output sequences generated by an RNG to tests to determine whether these output sequences are "good enough" from statistical perspective (i.e. have sufficient randomness). The nature of these tests varies. Some look at simple properties such as bias (the number of ones (1s) and zeroes (0s)) while others check more complex features, e.g. linear complexity, approximate entropy, looking for presence of certain patterns, running simulations, compression tests, etc. While the statistical tests are a perfectly valid way to detect serious flaws in a TRNG, they will most likely not detect flaws in a system which uses a TRNG combined with a PRNG. If the PRNG is based on a cryptographically strong hash function or block cipher, then even TRNG seeds with very low entropy will get expanded into pseudo-random sequences which are likely to pass statistical tests. This means that it can be very hard to detect a faulty RNG by using statistical tests unless the tests are applied directly to the seed generated by the TRNG.

The known answer tests (KATs) verify that, given known inputs, the correct outputs are produced. Assuming that the TRNG is properly tested and it is passing all tests, it is still important to test the PRNG which does the post-processing. A KAT applied to the PRNG comprises inputting values to the PRNG for which the outputs are pre-computed and stored, and comparing the actual output to it. In other words, KATs show expected results of running the PRNG on a given set of seeds irrespective of whether the TRNG is trustworthy or not. Since PRNGs are deterministic, they can be tested by KATs. However, it is not possible to apply such testing on non-deterministic TRNGs which typically produce a different output for the same input. Further, the TRNGs typically do not have inputs at all; they simply generate a sequence of bits upon request.

Runtime health checks are used to test RNGs while a system including the RNGs is running. In contrast to the above statistical tests and KATs, this type of testing is not intended for the detection of design-level flaws, but to catch situations where the RNG becomes faulty in field, during normal operation. The RNG may become faulty for a variety of reasons, e.g., manufacturing defects, edging, or exposure to radiation. Health checks can take different forms. It may, for example, be mandated that all approved RNGs are tested at startup time using KATs. It may subsequently be mandated that a runtime health check verifies that the RNG has not become "stuck", i.e., verifying that it is not generating the same numbers over and over again.

FIG. 1 illustrates a structure of a known random number generator 100. The RNG 100 may, for instance, be used in a processor. The RNG 100 comprises an entropy source 101 (i.e. TRNG) and a digital post-processing unit 102. The digital post-processing unit 102 comprises an Online Health Test (OHT) module 103 and a cryptographically secure Deterministic Random Bit Generator (DRBG) 104. The OHT 103 is intended to monitor the truly random numbers from the entropy source 101 to guarantee that they have a required minimum entropy. The DRBG 104 comprises a conditioner and a rate matcher. The conditioner computes new seeds for the rate matcher. Based of the seeds, the rate matcher computes 128-bit random numbers. This may, for instance, be done by performing an Advanced Encryption Standard (AES)-based encryption with a 128-bit seed and a 128-bit encryption key.

The generated random numbers are tested against a range of statistical tests in order to be compliant with various standards (e.g. NIST SP800-90 and FIPS 140-2). In addition, to be compliant with FIPS 140-2, the RNG 100 comprises a Built-In Self-Test (BIST) module which checks the functionality of the RNG 100 at each power-up.

When BIST is initiated, the entropy source 101 is disconnected and replaced by a 32-bit linear-feedback shift register (LFSR) 105 which generates a pseudo-random test patterns starting from a known initial state. A 32-bit multiple-input signature register (MISR) 106 compacts the resulting output responses of the rate matcher into a signature. This signature is then compared to a hard-wired expected signature to thereby detect faults in the DRBG 104, the conditioner and the rate matcher. If the signatures match, the RNG 100 passes the logical BIST (LBIST).

When running an application or a software component there is no means of verifying if the TRNG of the hardware, which it is deployed on, is trustworthy or not. It is not possible to do the known answer test of TRNGs because they are non-deterministic. If assumptions about trustworthiness of a TRNG are incorrect, this may have severe consequences for security critical applications such as key generation, authentication, etc.

The trustworthiness of a random number generator is generally more difficult to establish when the hardware is not the user's own, which is the case e.g. in a cloud computing context. While it is known how to verify many properties of a computing node e.g. in such a remote cloud computing environment, assuring trustworthiness of a random number generator is still difficult.

SUMMARY

An objective of the present disclosure is to address and improve various aspects for increasing security related to use of random number generators, for instance in cloud computing environments. A particular objective is to ensure trustworthiness of random number generators. These objectives and others are achieved by the methods, devices, computer programs and computer program products according to the appended independent claims, and by the embodiments according to the dependent claims.

The objective is according to an aspect achieved by a method for performing a trustworthiness test on a random number generator comprising a physically unclonable function, PUF-module. The trustworthiness test is implemented as a known answer test. The method comprises receiving, in the PUF-module, an input based on test data received from a verifier provided with at least one test data-test result pair; providing an output from the PUF-module; determining a test result based on the output from the PUF-module; and providing the test result to the verifier.

The method comprises a number of advantages. For instance, the method provides a way of assuring trustworthiness of a random number generator. By using a deterministic physically unclonable function module as an entropy source a known-answer-test can be made thereon, since a set of test data-test result pairs can be pre-computed and provided to the verifier (e.g. being a software application) to be used for assuring the trustworthiness of the random number generator comprising the PUF-module before it is deployed.

The objective is according to an aspect achieved by a computer program for a random number generator comprising a physically unclonable function, PUF-module. The computer program comprises computer program code, which, when executed on at least one processor on the random number generator causes the random number generator to perform the method as above.

The objective is according to an aspect achieved by a computer program product comprising a computer program as above and a computer readable means on which the computer program is stored.

The objective is according to an aspect achieved by a random number generator comprising a physically unclonable function, PUF-module. The random number generator is configured to: receive, in the PUF-module, an input based on test data received from a verifier provided with at least one test data-test result pair; provide an output from the PUF-module; determine a test result based on the output from the PUF-module; and provide the test result to the verifier.

The objective is according to an aspect achieved by a method of determining trustworthiness of a random number generator comprising a physically unclonable function, PUF-module, wherein a trustworthiness test is implemented as a known answer test. The method is performed in or by a verifier provided with at least one test data-test result pair. The method comprises providing test data to the PUF-module; obtaining a test result from the random number generator; and determining trustworthiness of the random number generator based on the obtained test result and the test data.

The objective is according to an aspect achieved by a computer program for a verifier provided with at least one test data-test result pair. The computer program comprises computer program code, which, when executed on at least one processor on the verifier causes the verifier to perform the method as above.

The objective is according to an aspect achieved by a computer program product comprising a computer program as above and a computer readable means on which the computer program is stored.

The objective is according to an aspect achieved by a verifier for determining trustworthiness of a random number generator comprising a physically unclonable function, PUF-module, a trustworthiness test being implemented as a known answer test, KAT. The verifier is provided with at least one test data-test result pair, and configured to:
  provide test data to the PUF-module,
  obtain a test result from the random number generator, and
  determine trustworthiness of the random number generator based on the obtained test result and the test result of the test data-test result pair.

Further features and advantages of the embodiments of the present teachings will become clear upon reading the following description and the accompanying drawings.

DETAILED DESCRIPTION

Figure 1:
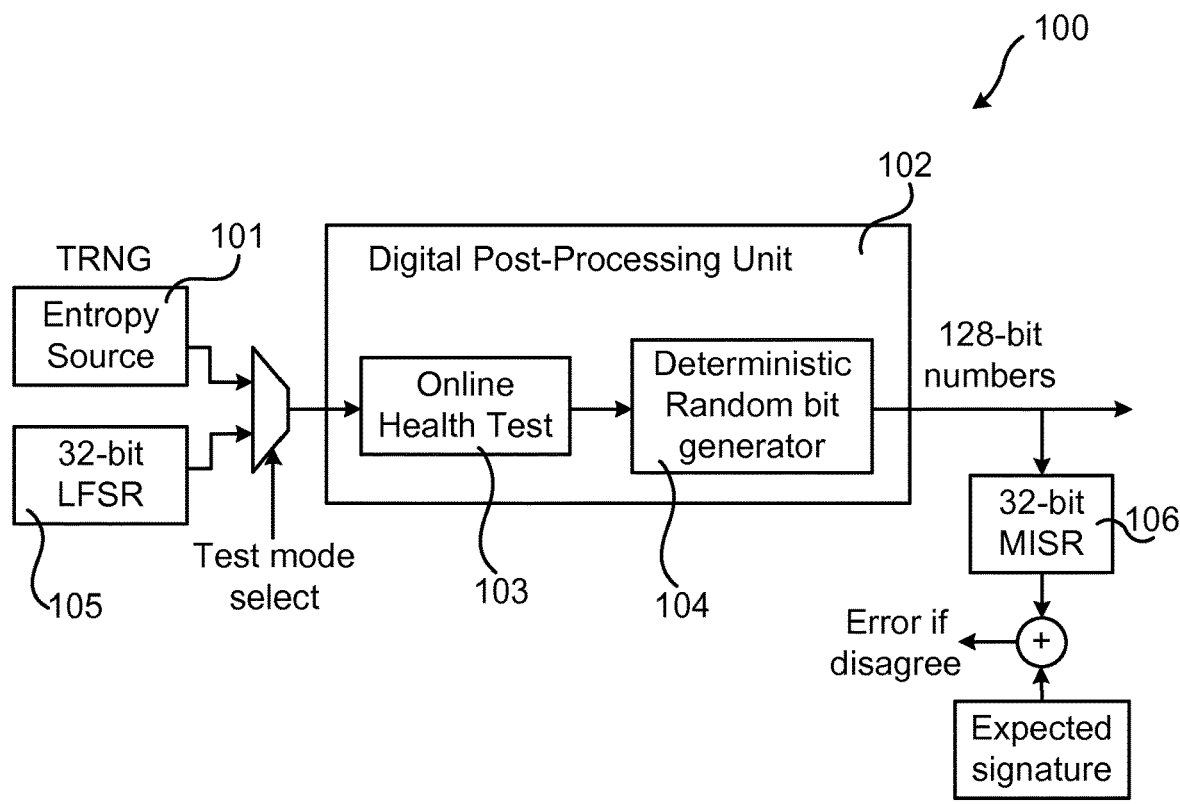
FIG. 1 illustrates a structure of a known random number generator.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to provide thorough understanding of the present teachings Physically Unclonable Functions (PUFs) are initially described.

A Physically Unclonable Function (PUF) is a physical entity embodied in a physical device (e.g. an integrated circuit (IC) or chip) which exploits the inherent process variations in the physical device to produce a response which is easy to compute by the PUF, but hard to predict for a PUF-external entity. Furthermore, an individual PUF is expected to be easy to manufacture, but practically impossible to duplicate, even if repeating the manufacturing process that fabricated the PUF, since various parameters, e.g. temperature, may vary during the manufacturing as well as material impurities etc. affecting the individual PUFs differently. As a note on terminology, "Physically Unclonable Function" is often denoted "Physical Unclonable Function" in literature, the terms often being used interchangeably. However, strictly speaking, there are non-physical ways to create a cloned function (as will be described), and therefore "Physically Unclonable Function" is used herein, signifying that there is no (known) way to create a cloned function by physical means.

PUFs have been proposed as a low-cost cryptographic primitive for device identification, challenge-response authentication, and secret key generation. Compared to conventional key storage approaches based on memories, PUFs are claimed to provide a higher level of tamper-resistance against invasive attacks.

Most PUF ICs developed up to now can be divided into two categories: delay-based (e.g., ring oscillator PUFs and arbiter PUFs) and memory-based (e.g., Static Random Access Memory (SRAM) PUFs).

PUFs can also be classified according to the number of different, unique challenges they accept into weak and strong types. A weak PUF accepts only one or a few challenges per PUF instance. Examples of weak PUFs are coating PUFs. A weak PUF provide a way of storing unique identifiers or long-term secret keys which is more resistant to tampering and counterfeit compared to memories. A strong PUF can accept many challenges. The arbiter PUF is an example of strong PUFs. Strong PUFs are typically used for challenge-response authentication. When implementing embodiments according to the present teachings, strong PUFs are preferred. Submitting the same challenge value usually results in the same PUF response-value. Occasionally the PUF may produce random errors which may be handled by error correcting code techniques.

Next, some notes on TRNG terminology are given. A TRNG is a non-deterministic apparatus which provides random, unpredictable outputs. Since a PUF is, as described, (more or less) deterministic, it may not be considered to be a TRNG in its conventional meaning. In particular, given the same input, the PUF typically produces the same output. However, it is noted that for "new" inputs (whose outputs have not yet been observed) the outputs are essentially random and completely unpredictable. In other words, given any set of inputs, $R1, R2, \ldots$, it is, for a well-constructed PUF, believed in essence impossible to predict the output for a new, previously unseen input R. This is in sharp contrast to Pseudo Random Number Generators, for which unpredictability of un-observed inputs is only computationally ensured, i.e. it is usually practically infeasible, but theoretically possible to predict outputs of PRNGs. A PUF-based RNG may therefore be considered as a True Random Function (TRF) as opposed to a True Random Generator. In the following a PUF-based random number generator construction will simply be referred to as a PUF-based RNG, which should be construed as meaning a (PUF-based TRF)-based RNG. All RNG embodiments disclosed herein pertain to such RNGs, although the term (T)RNG is sometimes simply used, or, when explicitly including any possible (algorithmic) post-processing of such (T)RNG, the term PRNG may be used.

Briefly, methods and devices are provided, in various embodiments, for generating true and pseudo random numbers in a software environment, e.g. in a cloud computing environment, and in particular a method of assuring trustworthiness of random number generators. A method is provided for hardware-assisted random number generation in a software environment such as a cloud computing environment, which method enables verification of trustworthiness of a random number generator comprising a PUF module as an entropy source a, which can be seen as a type of TRNG. Trustworthiness here means compliance with a set of statistical tests which are applied to a TRNG after its manufacturing.

Figure 2:
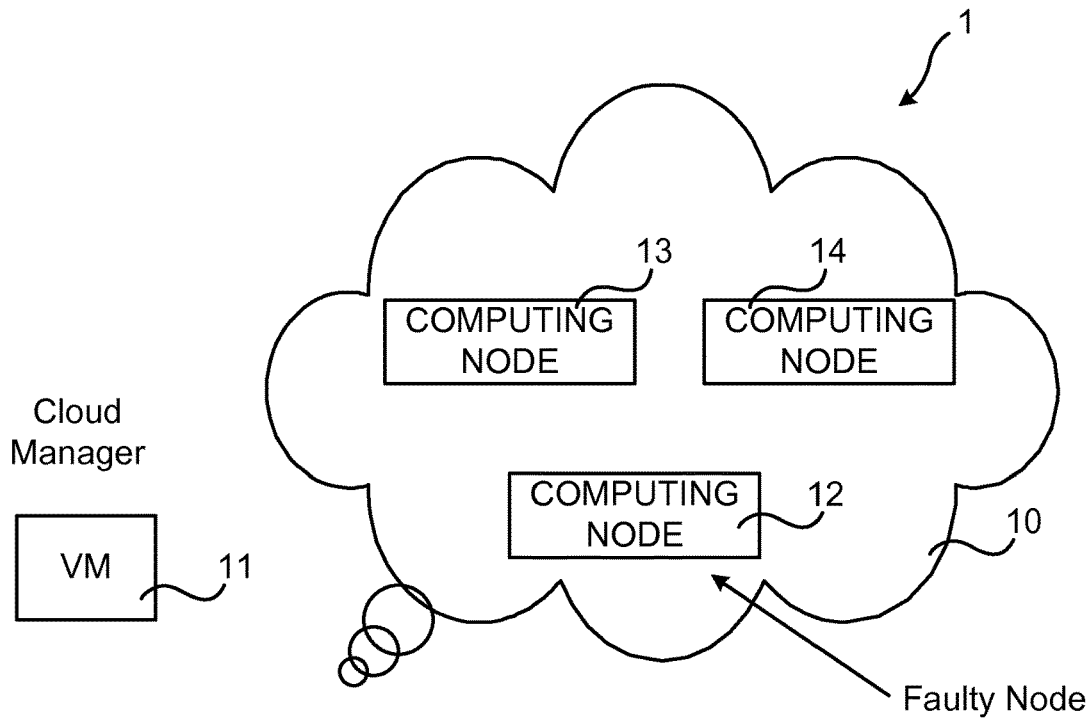
FIG. 2 illustrates an exemplary cloud computing environment.

FIG. 2 illustrates an exemplary cloud computing environment. In cloud computing, shared hardware resources and software are provided to e.g. computers as a service. A cloud manager prepares a virtual machine (VM) 11 to be deployed on a physical computing node 12, 13, 14 (e.g. a server) in a remote cloud 10. One (or more) of the computing nodes 12, 13, 14 may be faulty e.g. due to having a faulty RNG (computing node 12 indicated as faulty in FIG. 2). Many properties of the computing node 12, 13, 14 can be verified. For example, it is possible to verify which software the node is using by means of trusted computing techniques. However, it is, as has been described, difficult to assure trustworthiness of the RNG (which may comprise a TRNG and a PRNG). As described in the background section, it is not possible to perform a known answer test on a conventional complete RNG (i.e. including both TRNG and PRNG components) in order to assure that the TRNG is an approved one, because the behavior of the TRNG is non-deterministic or at least unpredictable. To overcome this, the present teachings provide a RNG comprising a PUF-module as entropy source (i.e. a type of TRNG), on which the known-answer-test can indeed be made. At reference numeral 1, a system 1 is indicated comprising at least one computing node 12, 13, 14 and a virtual machine 11. Before the virtual machine 11 is launched, a cloud manager may want to ensure that the RNG actually is provided by the intended hardware and/or that it is functioning properly, or more generally that the RNG has properties making it trustworthy. In the following, the virtual machine is used as an example of a "verifier" wanting to verify trustworthiness of the RNG. It is noted that that the verifier may be any type of hardware or software or combinations thereof.

Figure 3:
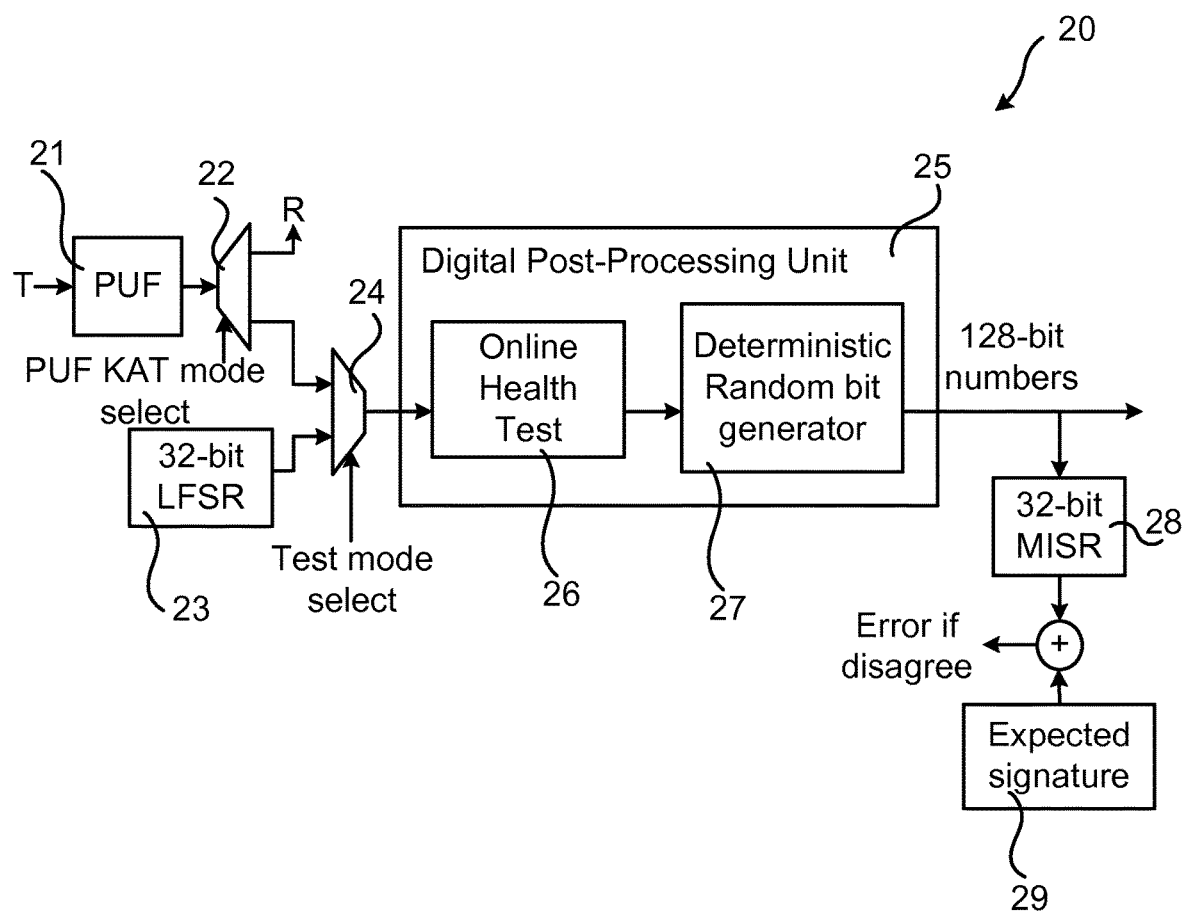
FIG. 3 illustrates an embodiment of a random number generator according to the present teachings.

FIG. 3 illustrates embodiments of a random number generator module 20 according to the present teachings. The RNG module 20 is realized by means of hardware and comprises a PUF 21, preferably a strong PUF 21 as mentioned earlier. The PUF 21 implements a random mapping or function. In this context it is noted that a mapping may be seen as an association between the input and the output. A random mapping may be viewed as a mapping where, for all practical purposes, it is impossible to predict which output will result from a given input. A given input is always mapped to the same output, i.e. even if the mapping is applied multiple times ("same output" including occurrence of conventional bit errors).

The function of the PUF 21 is thus to generate an m-bit response to a given n-bit challenge. For a given device (e.g. a particular IC, in the following also denoted chip), the PUF 21 embodied thereon is expected to generate the same response to a given challenge. After the device with the PUF 21 has been manufactured, but before it is deployed, a number of challenge-response pairs (also denoted test data-test result pairs herein) (T, R) are pre-computed and stored. These pairs may be used for subsequently testing trustworthiness of the PUF 21 during deployment.

The RNG module 20 comprises a digital post-processing unit 25, which comprises a deterministic random bit generator 27, also denoted PRNG 27. The RNG module 20 may also comprise an online health test 26. The digital post-processing unit 25 may process an input received from the PUF 21 and output e.g. a 128-bit number in response. That is, the PRNG 27 may expand the seed from the PUF 21 into longer pseudo-random sequences. An optional built-in self-test (BIST) module may check the functionality of the RNG 100 at each power-up.

To switch between the normal operation mode and the test mode a switch 24 may be provided. When a test mode is activated, e.g. BIST is initiated, the PUF module 21 is disconnected by the switch 24 and replaced by a 32-bit linear-feedback shift register (LFSR) 23 which generates a pseudo-random test patterns starting from a known initial state. The proper functioning of the PRNG 25 may thereby be established by comparing the output with an expected signature 29, as described in the background section.

According to the present teachings, the digital post-processing unit 25 may, besides the conventional mode, also be operated in a KAT test mode. The conventional, non-deterministic entropy source generator of prior art, e.g. as described in relation to FIG. 1, is replaced by the PUF module 21. The PUF module 21 takes an input T and produces the response R. A de-multiplexer 22 with a control signal "PUF KAT mode select" may be provided. This enables the PUF output to be provided to another receiver than the digital post-processing unit 25. In particular, "PUF KAT mode select" enables the selection on whether the output of the PUF 21 is to be provided to the post-processing unit 25 or to be provided outside the RNG module 20. The output of the PUF module 21 may hence be provided to a verifier performing a KAT test (T,R), or be fed into the digital post-processing unit 25 for normal operation. By using a deterministic PUF module 21 as a RNG (in particular as a TRNG, remembering the notes on PUF/TRNG given earlier), a possibility to make a "known answer test" and an ability to generate random numbers that are cryptographically strong is provided. The KAT is enabled since, as mentioned earlier, it is possible to pre-compute a set of challenge-response (test data, test result) pairs before e.g. software is deployed, and the generation of cryptographically strong random numbers is enabled owing to unpredictable properties of random mappings implemented by PUFs. In addition, the uniqueness of the PUF responses for a given chip (due to naturally occurring variations in the parameters of elements when integrated circuits are manufactured) and the PUF's unclonability also provide an assurance that the hardware of the RNG under test is authentic.

The possibility of performing a form of "known answer test" on a physical RNG (including the TRNG thereof) in-field is thus provided. There is no need to test statistical properties at this operational phase (i.e. in-field) since it can be assumed that these tests have already been performed, but there may be a need to verify that a tested and approved RNG is used. As mentioned earlier, a KAT test cannot be applied to a conventional TRNG due to the non-deterministic nature of the TRNG. However, the present teachings enable the applying of a KAT test to a PUF module 21 which implements a random mapping. If implemented properly, a PUF is expected to provide the same response to a same challenge, at least within an expected limit on the number of erroneous bits in the response (some bits may flip). There are known methods on how to design PUFs and how to assure error-correction (or toleration) of its output responses. It is noted that for input values that have not yet been fed to the PUF module 21, one obtains basically (one-time) truly random numbers.

For sake of further increased security, in some embodiments, the RNG module 20 only generates values based on seeds associated with the verifier 11 itself. Using a seed provided by a third party may entail the risk of the seed having been used before, that these seeds are replayed or that these seeds have been eavesdropped previously.

In a practical use case, the KAT mode is first selected by means of the de-multiplexer 22 and a number of inputs T1, T2, . . . , Tk are fed to the PUF module 21. Next, any suitable statistical tests are performed on the observed outputs R1, R2, . . . , Rk. Under the assumption that the R-values exhibit good statistical properties, the PUF module 21 is "approved" by selecting at least one T-value, and recording the corresponding R-value. This pair (T, R) thus forms a "certificate of approval" which may be embedded into software, i.e. a virtual machine image (ready to run on a hypervisor), VM 11. Later, when the VM 11 is launched, it will first perform a check, which in the simplest case is to check if the input T produces R as output from the PUF module 21. If so, the PUF/RNG 20 is assumed "approved" and the VM 11 switches to random number generation, feeding new T-input values into the PUF module 21, and using the result in e.g. a cryptographic application. Thus, if a PUF module 21 passes a KAT test (T, R), the verifier (e.g. VM 11) can conclude that the PUF-based RNG module 20 is an approved, trustworthy one. Furthermore, the uniqueness of the PUF responses for a given device and the unclonability of the PUF module 21 also provide an assurance that the hardware of the RNG module 20 under test is authentic, e.g., the chip has not been replaced by a counterfeit copy of apparently identical chip.

In the above described practical use case, at least one T-value (of the generated T,R-pairs) is used as input to the PUF module for verification thereof. If the verification is successful, then the VM 11 may start its operational phase. When, during this operational phase, the VM 11 needs to invoke the PUF/RNG 20 it will need additional T-input values, and these T-input values should be unused (not exposed). One way to obtain such additional T-input values is to provide the VM 11 with a number of additional T-values generated beforehand, e.g. as part of the mentioned "certificate of approval" pair of (T, R).

In general, one or more pairs (T, R) should be collected from each PUF module 21 after their manufacturing and stored for later use in KATs. Different possibilities for storing the R are conceivable. For example, a hash of R or a message authentication code (MAC) algorithm applied to R can be used instead of the R itself. Then the R has to be converted to the hash/MAC of R before the reply to T is submitted to the verifier. An advantage of using hash/MAC of R instead of directly R is that the output of the PUF 21 is not revealed, and thereby eliminating a possibility of modeling attacks which collect a large number of challenge-response pairs in order to model the mapping implemented by the PUF.

It is noted that if a MAC/hash is used, then it is preferable to do the error-correction of PUF responses before the MAC/hash is computed since a cryptographically strong MAC/hash is likely to multiply effect of an error. So, if errors are expected to be corrected and/or tolerated by the verifier, some type of perceptual hashing which map similar bit strings into the same result should be used. Alternatively, hashing methods which do not increase the number of errors can be used, for example, XORing halves of the PUF output.

As still another example, the R can be protected by encrypting the PUF output using a block cipher or stream cipher.

It may also be advantageous to exclude a possibility that an adversary could apply the same challenge T to the PUF module 21 multiple times and observe the responses R. The adversary could else perform reliability-based modelling attacks. This can be done, for example, by encrypting the PUF output using a stream cipher with a different initialization vector (IV). The IV has to be communicated to the verifier together with the encrypted PUF response. Once the PUF module 21 passes a KAT test, it can be used for random number generation in many ways.

In various embodiments, the PUFs are used as TRNGs by using the computed R as the next challenge T. For example, a feedback shift register is used to generate the subsequent challenges from an initial one, ensuring their uniqueness. A possible concern with the computed R as the next challenge T is that the PUF module 21 many get stuck in some short cycle, e.g. if R=T, then it will generate a sequence of T, T, T, . . . until re-initialized with another T upon the next KAT test. However, from statistical properties of random mappings, it is known that, in a random mapping of size N, cycles present themselves after about $\sqrt{N}$ iteration steps. In the present case $N=2^{|T|}$, where |T| stands for the size of (number of bits in) T. Thus, for |T|=128 bits, the expected number of steps to reach a cycle is $2^{64}$.

Another concern may be that the random seeds generated by the PUF module 21 during the normal operation of the RNG 20 are known to, e.g. the verifier. However, if only a certain number of pairs (T, R) are collected from each PUF module 21 after their manufacturing and stored, then the rest of the random mapping implemented by a PUF module 21 is not known and can therefore be viewed as a pool of (one-time) truly random numbers.

Figure 4:
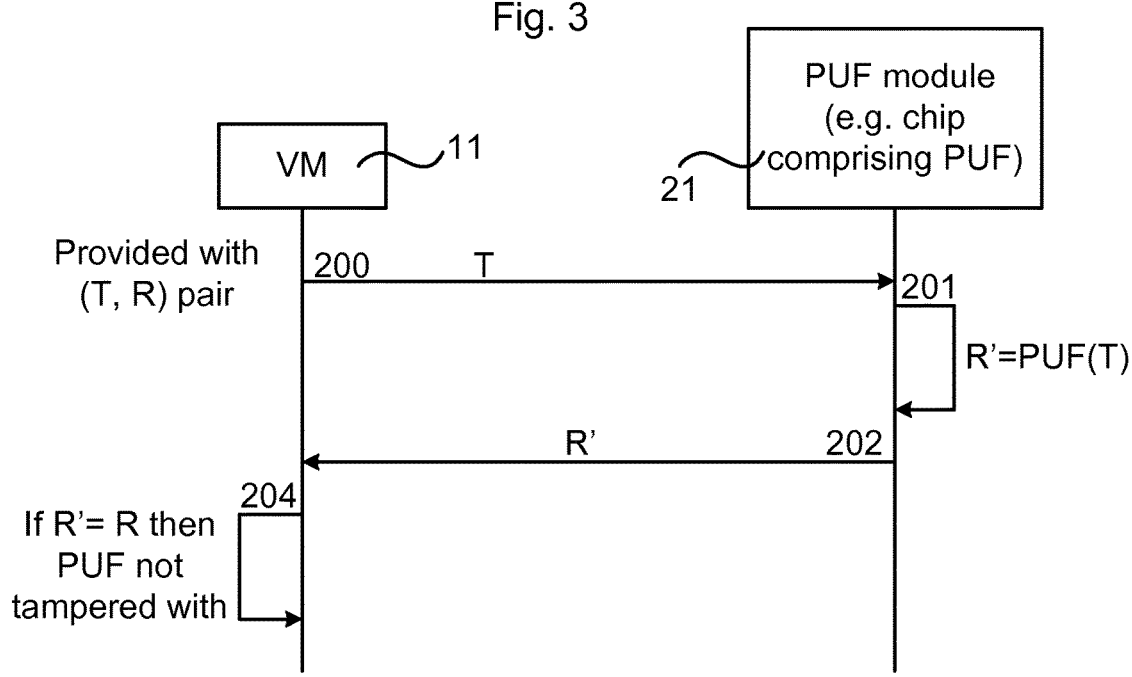
FIG. 4 is a sequence diagram illustrating a testing procedure.

FIG. 4 is a sequence diagram illustrating a testing procedure. A method, in various embodiments, according to the present teachings is described next in an exemplary use case. At the start of the execution of a VM (or software) running on e.g. a computing node 12, 13, 14 of the cloud 10, the PUF module 21 is provided a challenge T. That is, at arrow 200, the VM 11 provides the challenge T to the PUF module 21. The PUF module 21 generates (arrow 201) the response R'=PUF(T), and sends (arrow 202) it to the VM 11. The authenticity of the PUF 21 is verified (arrow 204) by comparing this response R' to the expected response R of the test data-test result (T, R) pair that the verifier is provided with. If verification passes (e.g. if R'==R), the KAT is successful and the PUF module 21 is considered to be an approved one and thus trustworthy. The verification may also be considered a pass while having maximum a defined number of bits differing. Such discrepancies between R' and R, i.e. error tolerance, may need to be accepted since some bits may be expected to flip. The RNG 20 is switched to a normal mode of operation in which the PUF module 21 generates random seeds to the PRNG 27 and the PRNG 27 expands these seeds into longer pseudo-random sequences, as was described with reference to FIG. 3. The generation of the random seed by the PUF module 21 is done, for example and as mentioned earlier, by using the response of the PUF module 21 as the next challenge. It is noted that error correction of PUF responses is needed only for KAT-testing mode. In the normal mode of operation errors are even desirable since the erroneous bits provide truly random bits.

If verification fails, an alert may be raised.

Figure 5:
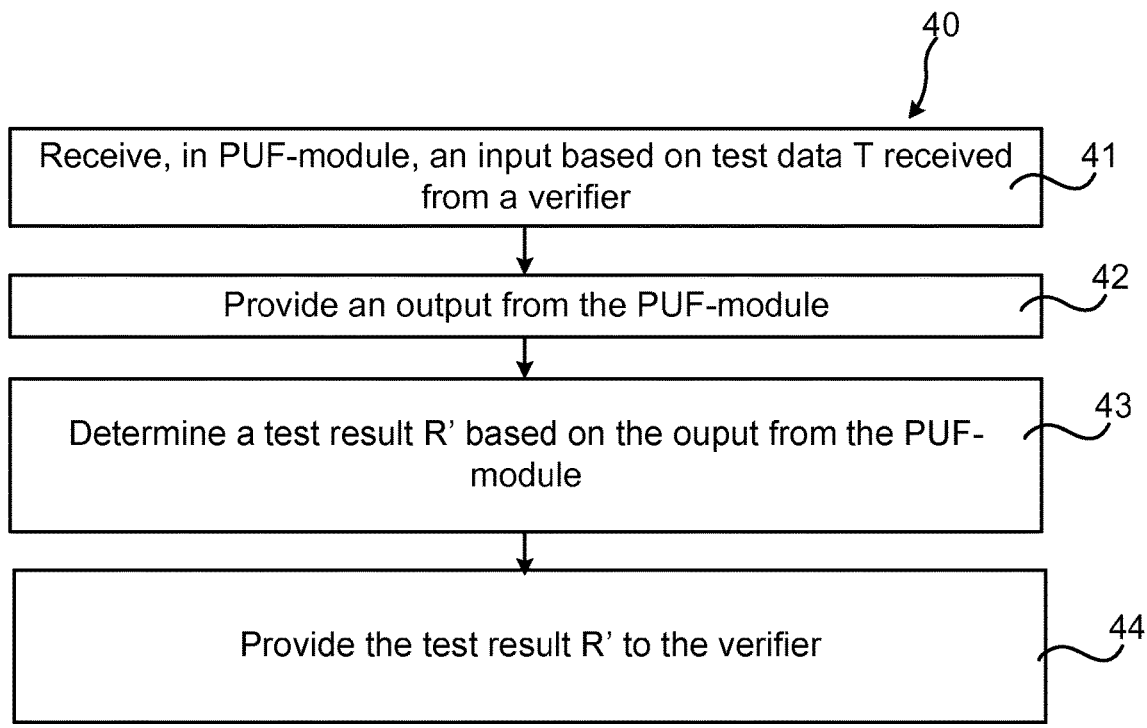
FIG. 5 illustrates a flow chart over steps of embodiments of a method in a random number generator in accordance with the present teachings.

The various features and embodiments that have been described can be combined in many different ways, examples of which are given next with reference first to FIG. 5.

FIG. 5 illustrates a flow chart over steps of embodiments of a method in a random number generator in accordance with the present teachings.

A method 40 is provided for performing a trustworthiness test on a random number generator 20 comprising a physical unclonable function, PUF-module 21. The trustworthiness test is implemented as a known answer test, KAT. The PUF-module depends on random physical factors that it experiences during its manufacturing, for instance factors such as temperature, vibrations etc. The structure of the PUF-module 21 can hence be assumed to not be duplicated or cloned even when using the exact same manufacturing process. The PUF-module 21 may therefore be seen as implementing a random mapping for mapping an input to an output, as has been described and exemplified.

The method 40 comprises receiving 41, in the PUF-module 21, an input based on test data, T, received from a verifier 11. The verifier 11 is provided with at least one test data-test result pair, T, R. The input may be the test data T as such or it may be received in the random number generator 20 and transformed before being input to the PUF-module 21. The verifier 11 may, for instance, comprise a virtual machine having an ability to run an application or software. In other embodiments, the verifier may be a remote host connected by a network to another host, wherein the latter comprises the PUF-based RNG under test.

The method 40 comprises providing 42 an output from the PUF-module 21. The output from the PUF-module 21 is the result of the mapping performed by the PUF-module 21.

The method 40 comprises determining 43 a test result, R', based on the output from the PUF-module 21. The test result, R', based on the output from the PUF-module 21 may, for instance, be the output as such.

The method 40 comprises providing 44 the test result, R', to the verifier 11.

The method 40 provides a way of assuring trustworthiness of a random number generator. By using a physically unclonable function module as an entropy source a known-answer-test can be made thereon, since a set of test data-test result pairs can be pre-computed and provided to the verifier (e.g. being a software application) before the verifier is deployed.

In some embodiments, the input based on the test data, T, comprises one of: the test data, T, as received and a transformation of the received test data, T. That is, in some embodiments the test data T is input directly to the PUF-module 21, while in other embodiments, the test data T is first transformed in some way.

In different embodiments, the determining 43 comprises setting as the test result, R', the output from the PUF-module 21.

In some embodiments, the determining 43 comprises post-processing the output of the PUF-module 21 in a digital post-processing unit 25, and providing 44 the test result R' as the output of the digital post-processing unit 25. That is, the output of the PUF-module 21 is used as seed to the pseudorandom number generator 27, which may implement any mapping and output the test result R'.

In some embodiments, the post-processing comprises using the output of the PUF-module 21 as input to a pseudorandom number generator 27 and generating the test result R' as an output of the pseudorandom number generator 27.

In some embodiments, the method 40 comprises, prior to the receiving 41, switching the PUF-module 21 to a test mode in which the output thereof is fed outside the random number generator 20.

In some embodiments, the method 40 comprises converting the test result, R', by applying a hash function to the test result, R', and providing 44 the returned hash value as the test result to the verifier 11. As another example, a device authentication may be piggy-backed on the test result, then an encapsulating device may compute a MAC(Key K, R) and provide that to the verifier 11. The verifier would need to have the same Key K to check the MAC. Alternatively, MAC(R, I) may be used, i.e. R is used as the MAC key, and where I is some known information. Then MAC(R, I) is computed and provided to the verifier 11. The verifier would in both cases need to have the key (Key K or R) to check the MAC.

In some embodiments, the method 40 comprises, before the providing 44, encrypting the test result R'.

In some embodiments, the encrypting comprises using a stream cipher with an initialization vector and wherein the providing 44 comprises providing the initialization vector with the test result R'. In other embodiments, the encrypting comprises using a block cipher. Different types of encryption may be used.

Figure 6:
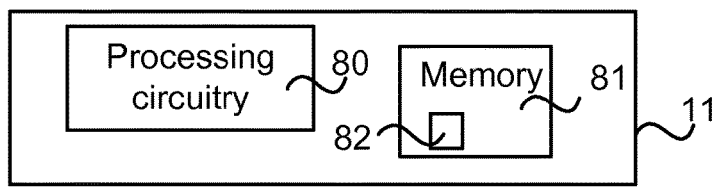
FIG. 6 illustrates schematically a random number generator and means for implementing embodiments of the method in accordance with the present teachings.
Figure 6:
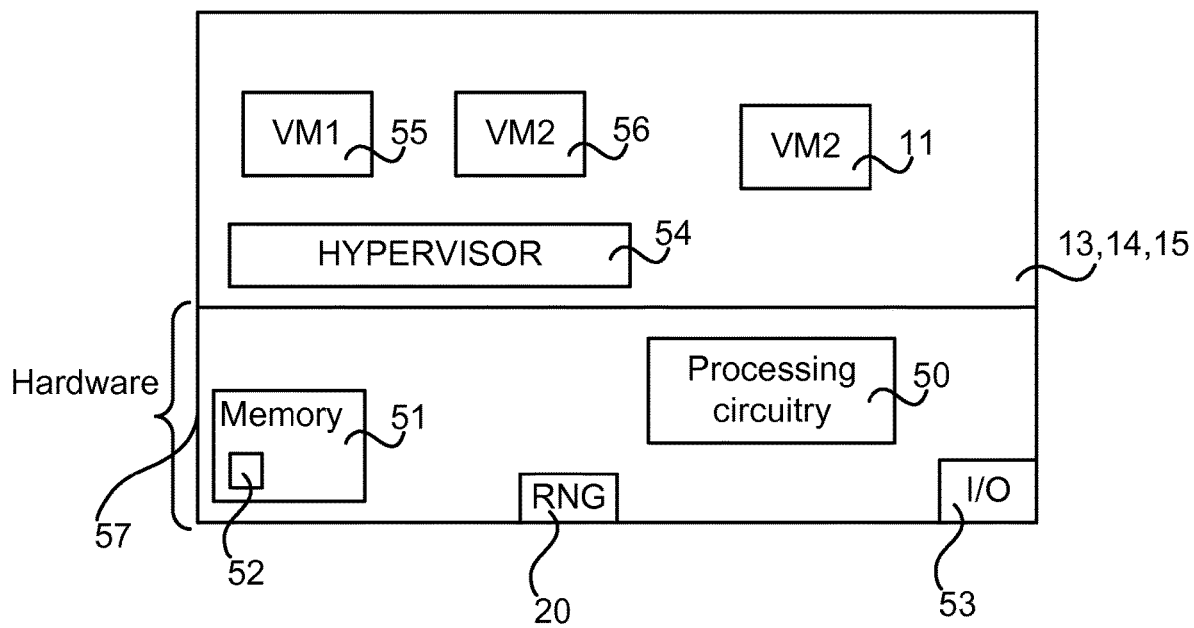

FIG. 6 illustrates schematically a random number generator and means for implementing embodiments of the method in accordance with the present teachings.

From an end-user perspective virtual machines behave much like traditional computers with an operating system running on top of hardware; the underlying mechanics are, however, different. Virtual machines 11, 55, 56 do not run directly, or at least not completely directly, on top of the hardware 57. Instead an entity denoted hypervisor 54 controls their execution and can modify what hardware resources they have access to. In some cases the hypervisor 54 proxies the virtual machines' access to those resources. The hypervisor 54 itself can be implemented in different ways, but may typically run on the same hardware 57 as the virtual machines 11, 55, 56. This setup allows multiple virtual machines 11, 55, 56 to run on the same physical hardware 57 simultaneously. The cloud computing node 13, 14, 15 may comprise a virtual operating system executing on the hardware 57. The virtual operating system comprises the virtual machines 11, 55, 56, which are run by the hypervisor 54.

The random number generator 20 may be part of hardware 57 (separate or same as the virtual machines 11, 55, 56) and comprises processing circuitry 50, which may be any combination of one or more of a suitable central processing unit (CPU), multiprocessor, microcontroller, digital signal processor (DSP), etc., capable of executing software instructions stored in a computer program product 51, e.g. in the form of a storage medium 51. The processing circuitry 50 may further be provided as at least one application specific integrated circuit (ASIC), or field programmable gate array (FPGA).

The processing circuitry 50 is configured to cause the random number generator 20 to perform a set of operations, or steps, e.g. as described in relation to FIG. 5. For example, the storage medium 51 may store the set of operations, and the processing circuitry 50 may be configured to retrieve the set of operations from the storage medium 51 to cause the random number generator 20 to perform the set of operations. The set of operations may be provided as a set of executable instructions.

The processing circuitry 50 is thereby arranged to execute methods as disclosed herein.

The storage medium 51 may also comprise persistent storage, which, for example, can be any single one or combination of magnetic memory, optical memory, solid state memory or even remotely mounted memory.

A random number generator 20 is provided comprising a physical unclonable function, PUF-module 21. The random number generator 20 is configured to:

receive, in the PUF-module 21, an input based on test data, T, received from a verifier 11 provided with at least one test data-test result pair, T, R, provide an output from the PUF-module 21, determine a test result, R', based on the output from the PUF-module 21, and provide the test result, R', to the verifier 11.

The random number generator 20 may be configured to perform the above steps e.g. by comprising processing circuitry 50 and memory 51, the memory 51 containing instructions executable by the processing circuitry 50, whereby the random number generator 20 is operative to perform the steps. That is, in an embodiment, a random number generator 20 is provided comprising a physical unclonable function, PUF-module 21. The random number generator 20 comprises processing circuitry 50 and memory 51, the memory 51 containing instructions executable by the processing circuitry 50, whereby random number generator 20 is operative to: receive, in the PUF-module, an input based on test data received from a verifier provided with at least one test data-test result pair, provide an output from the PUF-module, determine a test result based on the output from the PUF-module, and provide the test result to the verifier.

In an embodiment, the input based on the test data, T, comprises one of: the test data, T, as received and a transformation of the received test data, T.

In some embodiments, the random number generator 20 is configured to determine by setting as the test result, R', the output from the PUF-module 21.

In other embodiments, the random number generator 20 is configured to determine by post-processing the output of the PUF-module 21 in a digital post-processing unit 25, and providing the test result R' as the output of the digital post-processing unit 25.

In some embodiments, the random number generator 20 is configured to post-process by using the output of the PUF-module 21 as input to a pseudorandom number generator 27, and generating the test result R' as an output of the pseudorandom number generator 27.

In some embodiments, the random number generator 20 is configured to, prior to the receiving, switch the PUF-module 21 to a test mode in which the output thereof is fed outside the random number generator 20.

In some embodiments, the random number generator 20 is configured to convert the test result, R', by applying a hash function to the test result, R', and providing the returned hash value as the test result to the verifier 11.

In some embodiments, the random number generator 20 is configured to, before the providing, encrypt the test result R'.

In a variation of the above embodiment, the random number generator 20 is configured to encrypt by using a stream cipher with an initialization vector and configured to provide the initialization vector with the test result R'. In other embodiments, the random number generator 20 is configured to encrypt by using a block cipher.

FIG. 6 also illustrates a verifier 11 comprising a hardware device, with processing circuitry 80, memory 81 and computer program 82. The processing circuitry 80 is configured to cause the verifier 11 to perform a set of operations, or steps, e.g. as described later in relation to FIG. 8. For example, the storage medium 81 may store the set of operations, and the processing circuitry 80 may be configured to retrieve the set of operations from the storage medium 81 to cause the verifier 11 to perform the set of operations. The set of operations may be provided as a set of executable instructions. The processing circuitry 80 is thereby arranged to execute methods as disclosed herein.

Figure 7:
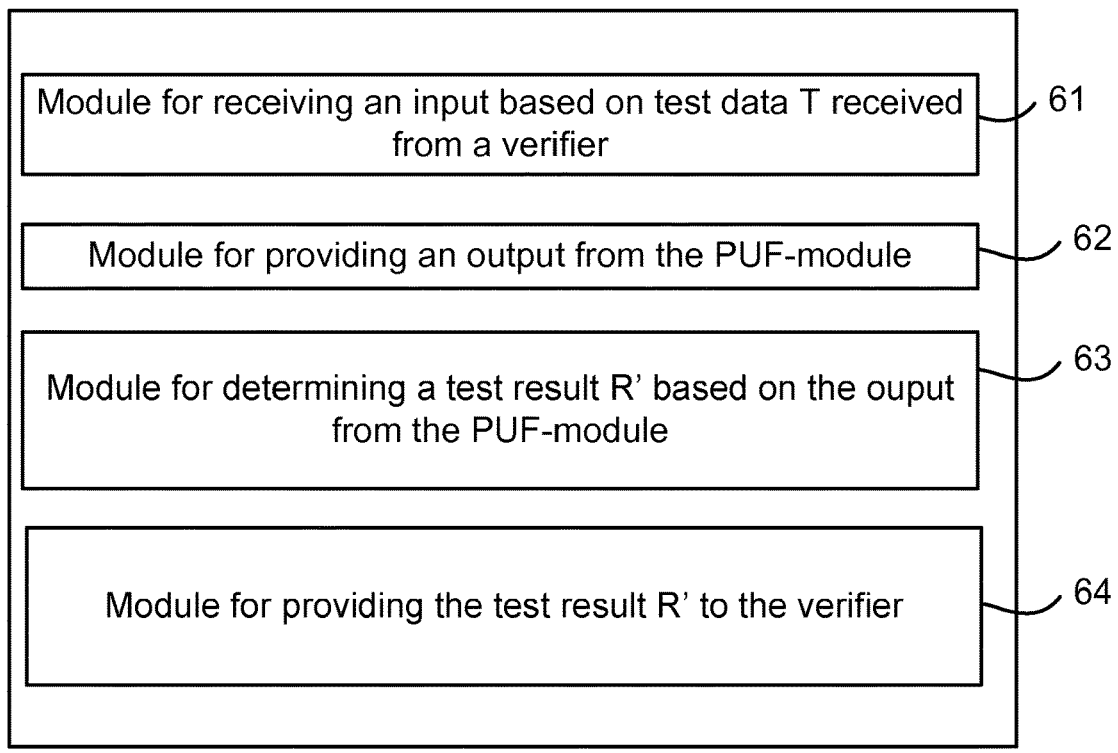
FIG. 7 illustrates a random number generator comprising function modules/software modules for implementing embodiments of the present teachings.

FIG. 7 illustrates a random number generator comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 40 that has been described in various embodiments.

A random number generator is provided on which a trustworthiness test may be performed. The random number generator comprises a physical unclonable function, PUF-module and the trustworthiness test is implemented as a known answer test.

The random number generator comprises a first module 61 for receiving an input based on test data, T, received from a verifier provided with at least one test data-test result pair. The first module 61 may, for instance, comprise receiving circuitry or input circuitry. The first module 61 may comprise the PUF-module as has been described.

The random number generator comprises a second module 62 for providing an output from the PUF-module.

The random number generator comprises a third module 63 for determining a test result based on the output from the PUF-module.

The random number generator comprises a fourth module 64 for providing the test result to the verifier.

It is noted that one or more of the modules 61, 62, 63, 64 may be replaced by units.

Figure 8:
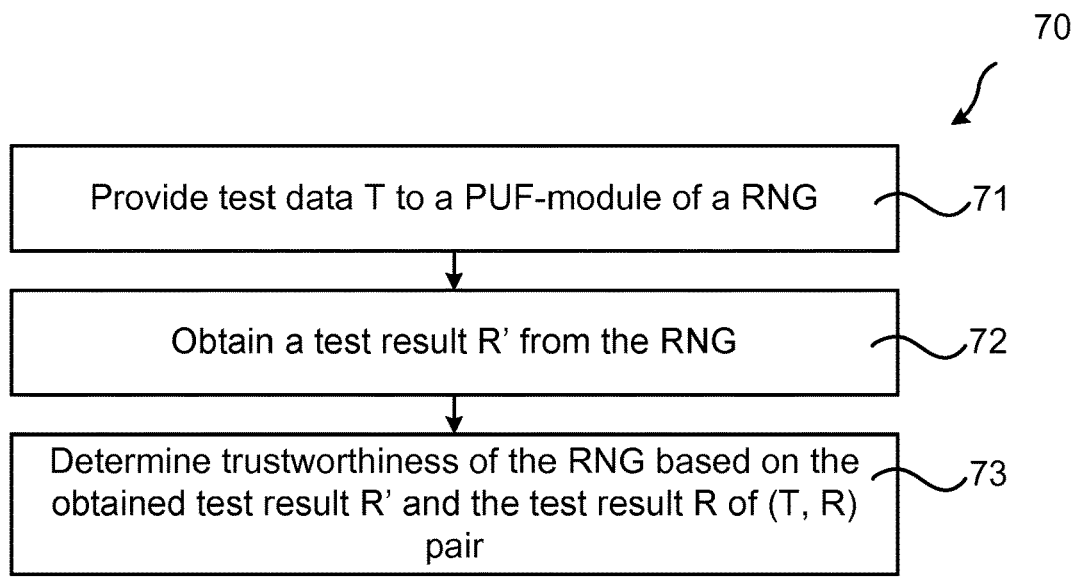
FIG. 8 illustrates a flow chart over steps of embodiments of a method in a verifier in accordance with the present teachings.

FIG. 8 illustrates a flow chart over steps of embodiments of a method in a verifier in accordance with the present teachings. A method 70 of determining trustworthiness of a random number generator 20 comprising a physical unclonable function, PUF-module 21 is also provided, wherein the trustworthiness test is implemented as a known answer test, KAT. The method 70 is performed in a verifier 11 provided with at least one test data-test result pair, T, R. The method 70 comprises:

providing 71 test data, T, to the PUF-module 21, obtaining 72 a test result, R', from the random number generator 20, and determining 73 trustworthiness of the random number generator 20 based on the obtained test result, R', and the test result, R of the test data-test result pair.

In an embodiment, the determining 73 comprises determining the random number generator 20 to be trustworthy for the case that a matching of the obtained test result R' to the test result R of the test data-test result pair fulfills a matching criterion.

In a variation of the above embodiment, the matching criterion comprises the obtained test result R' differing from the test result R of the test data-test result pair by less than a defined number of bits.

A verifier 11 is provided for determining trustworthiness of a random number generator 20 comprising a physical unclonable function, PUF-module 21, a trustworthiness test being implemented as a known answer test, KAT. The verifier 11 is provided with at least one test data-test result pair, (T, R) and configured to:

provide test data, T, to the PUF-module 21, obtain a test result, R', from the random number generator 20, and determine trustworthiness of the random number generator 20 based on the obtained test result, R', and the test result, R of the test data-test result pair.

In an embodiment, the verifier 11 is configured to determine the random number generator 20 to be trustworthy for the case that a matching of the obtained test result R' to the test result R of the test data-test result pair fulfills a matching criterion.

In an embodiment, the matching criterion comprises the obtained test result R' differing from the test result R of the test data-test result pair, by less than a defined number of bits.

Figure 9:
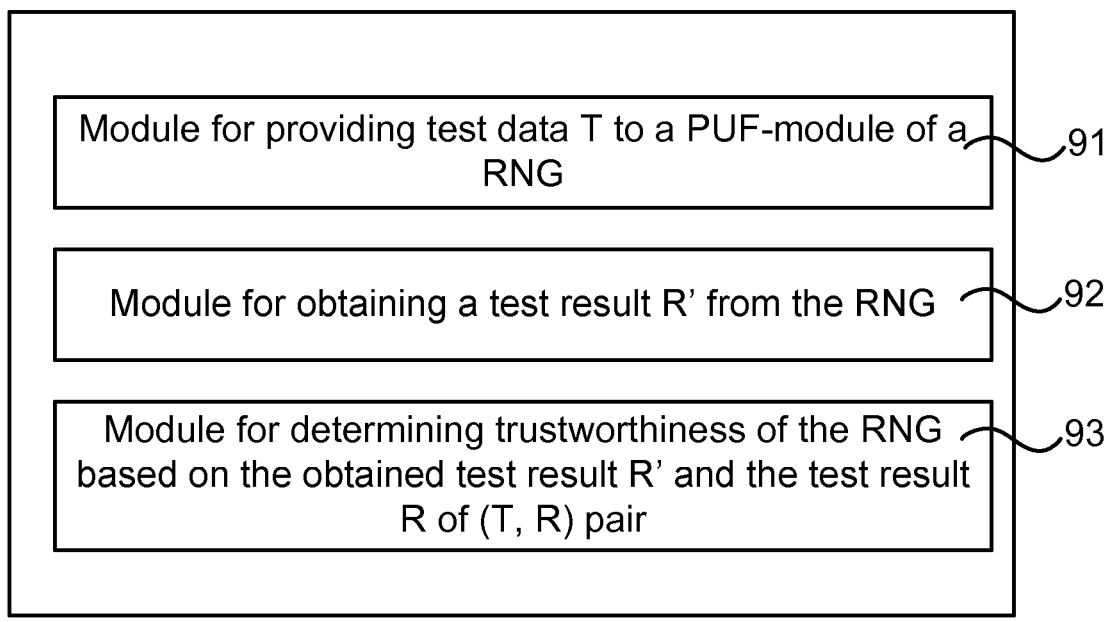
FIG. 9 illustrates a verifier comprising function modules/software modules for implementing embodiments of the present teachings.

FIG. 9 illustrates a verifier comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 40 that has been described in various embodiments.

A verifier 11 is provided for determining trustworthiness of a random number generator comprising a physical unclonable function, PUF-module, a trustworthiness test being implemented as a known answer test, KAT. The verifier 11 is provided with at least one test data-test result pair, (T, R). The verifier comprises a first module for providing test data to the PUF-module 21. The first module 91 may, for instance, comprise an output device.

The verifier comprises a second module 92 for obtaining a test result, R', from the random number generator. The second module 92 may, for instance, comprise an input device for receiving the test result R'.

The verifier comprises a third module 93 for determining trustworthiness of the random number generator based on the obtained test result, R', and the test result, R of the test data-test result pair. The third module 93 may, for instance, comprise processing circuitry adapted to perform the determining.

It is noted that one or more of the modules 91, 92, 93 may be replaced by unit.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for performing a trustworthiness test on a random number generator (RNG) of a physical computing node, the trustworthiness test being implemented as a known answer test (KAT), the method comprising:
receiving, in a physical unclonable function (PUF)-module of the RNG, an input based on test data (T) received from a verifier circuit provided with at least one test data-test result pair (T, R);
providing an output from the PUF-module;
post-processing the output of the PUF-module in a digital post-processing unit to determine a test result (R'); and
providing the test result (R') to the verifier circuit.

2. The method as claimed in claim 1, wherein the input based on the test data (T) comprises one of: the test data (T) as received and a transformation of the received test data (T).

3. The method as claimed in claim 1, wherein the determining comprises setting as the test result (R') the output from the PUF-module.

4. The method as claimed in claim 1, wherein the post-processing comprises using the output of the PUF-module as input to a pseudorandom number generator, and generating the test result (R') as an output of the pseudorandom number generator.

5. The method as claimed in claim 1, further comprising, prior to the receiving the input, switching the PUF-module to a test mode in which the output thereof is fed outside the RNG.

6. The method as claimed in claim 1, further comprising applying a hash function to the determined test result (R') and providing a returned hash value as the test result (R') to the verifier.

7. The method as claimed claim 1, further comprising encrypting the determined test result (R') and providing the encrypted determined test result as the test result (R') to the verifier.

8. A random number generator (RNG) circuit configured to facilitate a trustworthiness test by a verifier circuit, the trustworthiness test being implemented as a known answer test (KAT), the RNG comprising:
a physical unclonable function (PUF)-module configured to:
receive an input based on test data (T) received from a verifier provided with at least one test data-test result pair (T, R), and
provide an output from the PUF-module; and
a digital post-processing unit configured to:
determine a test result (R') based on the output from the PUF-module, and
provide the test result (R') to the verifier.

9. The random number generator as claimed in claim 8, wherein the input based on the test data (T) comprises one of the following: the test data (T) as received, or a transformation of the received test data (T).

10. The random number generator as claimed in claim 8, wherein the digital post-processing unit is configured to set the output from the PUF-module as the test result (R').

11. The random number generator as claimed in claim 8, wherein the digital post-processing unit comprises a pseudorandom number generator (PRNG) configured to receive the output of the PUF-module as an input and to generate the test result (R') as an output.

12. The random number generator as claimed in claim 8, further comprising a demultiplexer configured to feed the output of the PUF-module outside the random number generate based on an indication of a test mode for the random number generator.

13. The random number generator as claimed in claim 8, wherein the digital post-processing unit is configured to apply a hash function to the determined test result (R') and provide a returned hash value as the test result (R') to the verifier.

14. A method, performed by verifier circuitry, of determining trustworthiness of a random number generator (RNG) of a physical computing node, the method comprising:
providing test data (T) to a physical unclonable function (PUF)-module of the RNG, wherein the test data (T) is part of a test data-test result pair (T, R);
obtaining a test result (R') from a digital post-processing unit, of the RNG, that is configured to determine the test result (R') based on an output from the PUF-module; and
determining trustworthiness of the RNG based on a known answer test (KAT) involving the obtained test result (R') and the test result (R) of the test data-test result pair.

15. The method as claimed in claim 14, wherein determining trustworthiness comprises determining the random number generator to be trustworthy based on a comparison of the obtained test result (R') to the test result (R) fulfilling a matching criterion.

16. The method as claimed in claim 15, wherein the matching criterion comprises the obtained test result (R') differing from the test result (R) by less than a predefined number of bits.

17. A verifier circuit configured to determine trustworthiness of a random number generator (RNG) of a physical computing node, the verifier circuit comprising:
processing circuitry; and
a memory storing computer-executable instructions that, when executed by the processing circuitry, configure the verifier circuit to:
provide test data (T) to a physical unclonable function (PUF)-module of the RNG, wherein the test data (T) is part of a test data-test result pair (T, R);

obtain a test result (R') from a digital post-processing unit, of the RNG, that is configured to determine the test result (R') based on an output from the PUF-module; and determine trustworthiness of the RNG based on a known answer test (KAT) involving the obtained test result (R') and the test result (R) of the test data-test result pair.

18. The verifier circuit as claimed in claim 17, wherein execution of the instructions configures the verifier circuit to determine the random number generator to be trustworthy based on a comparison of the obtained test result (R') to the test result (R) fulfilling a matching criterion.

19. The verifier circuit as claimed in claim 18, wherein the matching criterion comprises the obtained test result (R') differing from the test result (R) by less than a predefined number of bits.

* * * * *